United States Patent [19]
Crossland et al.

[11] Patent Number: 5,339,090
[45] Date of Patent: Aug. 16, 1994

[54] SPATIAL LIGHT MODULATORS

[75] Inventors: William A. Crossland, Harlow; David Vass, Edinburgh, both of Great Britain; Neil Collings, Peseux, Switzerland

[73] Assignee: Northern Telecom Limited, Montreal, Canada

[21] Appl. No.: 943,134

[22] Filed: Sep. 10, 1992

Related U.S. Application Data

[63] Continuation of Ser. No. 540,905, Jun. 29, 1990, abandoned.

[30] Foreign Application Priority Data

Jun. 23, 1989 [GB] United Kingdom ............ 8914453.9

[51] Int. Cl.$^5$ .................................................. G09G 3/36
[52] U.S. Cl. .................................... 345/90; 345/205
[58] Field of Search .............. 340/718, 719, 784, 803, 340/805, 825.81, 825.82, 825.86, 825.87, 763, 765; 359/55-57, 72; 362/23; 345/204, 205, 206, 90-92, 50, 51, 48

[56] References Cited

U.S. PATENT DOCUMENTS

| | | | |
|---|---|---|---|
| 3,871,170 | 3/1975 | Bergey | 362/23 |
| 3,940,756 | 2/1976 | Findlay | 340/798 |
| 3,947,840 | 3/1976 | Craford et al. | 340/719 |
| 4,239,346 | 12/1980 | Lloyd | . |
| 4,345,248 | 8/1982 | Togashi et al. | 340/784 |
| 4,406,997 | 9/1983 | Depp et al. | 340/718 |
| 4,676,761 | 6/1987 | Poujois | 340/784 |
| 4,699,498 | 10/1987 | Naemura | . |
| 4,730,903 | 3/1988 | Yamazaki | . |
| 4,846,559 | 7/1989 | Kniflier | 359/72 |

FOREIGN PATENT DOCUMENTS

| | | |
|---|---|---|
| 0117957 | 9/1984 | European Pat. Off. . |
| 01422326 | 5/1985 | European Pat. Off. . |
| 0147027 | 7/1985 | European Pat. Off. . |
| 0151508 | 8/1985 | European Pat. Off. . |
| 0234429 | 9/1987 | European Pat. Off. . |
| 0284134 | 9/1988 | European Pat. Off. . |
| 0294900 | 12/1988 | European Pat. Off. . |
| 2149176 | 6/1985 | United Kingdom . |
| 2149555 | 6/1985 | United Kingdom . |
| 2166256 | 4/1986 | United Kingdom . |
| 2188742 | 10/1987 | United Kingdom . |

OTHER PUBLICATIONS

Bahr et al., "Optical and dielectric investigations on the electroclinic effect [etc.]", Liquid Crystals, 1987, vol. 2, No. 6, pp. 825-831.

Crossland et al., "Prospects and Problems of Ferroelectric LCD's", Proceedings of the SID, vol. 29, No. 3, 1988, pp. 237-244.

Journal of Physics E Scientific Instruments, vol. 21, 1988 pp. 460-466 Wahl et al. "Experimental drive and addressing techniques for ferroelastic liquid crystal devices".

Carlson et al., "Temperature and Wave Vector Dependence of the Eigenfrequencies . . . (etc.)", Ferroelectrics, 1988, vol. 84, pp. 223-240.

Collings, et al., "The Novel Application of the Electroclinic Electro-optic Effect to Light Valve Technology", Optical Computing 88 (1988), vol. 963, pp. 46-50.

Davey, et al., "Potential and Limitations of the Electroclinic Effect in Device Applications", Ferroelectrics 1991, vol. 114, pp. 101-112.

Clark, et al., "Submicrosecond Bistable Electro-optic Switching in Liquid Crystals", Appl. Physics Letters, Jun. 1, 1980, vol. 36, No. 11, pp. 889-901.

IEE Proceedings, vol. 133 pt. J No. 1 Feb. 1986, pp. 77-82 I-Underwood et al. "Evaluation of an nMOS VLSI any for an adaptive liquid-crystal spatial ligh modulator" (Chapters 1,3).

*Primary Examiner*—Alvin E. Oberley
*Assistant Examiner*—Regina Liang
*Attorney, Agent, or Firm*—Lee, Mann, Smith, McWilliams, Sweeney & Ohlson

[57] ABSTRACT

A smart pixel is comprised by a chiral smectic liquid crystal light modulator (45) (ferro-electric or electroclinic) disposed on a semiconductor substrate and having associated therewith electronic circuitry (41-44) formed in the semiconductor substrate in particular a single crystal silicon VLSI substrate, which circuitry is such as to provide localised intelligence (electrical signal processing and conditioning, pointwise operations, logic functions) at the modulator. The circuitry may comprise photodetector/threshold circuitry (FIG. 7) or digital-to-analogue conversion (FIGS. 3 or 4), for example.

9 Claims, 9 Drawing Sheets

| ELECTRICAL INPUTS | | | OPTICAL INPUTS | | | | OPTICAL OUTPUT | OPTICAL OPERATION OR FUNCTION |
|---|---|---|---|---|---|---|---|---|
| E(1) | E(2) | E(3) | B(i+l,j) | B(i,j) | B(i+l,j) | B(i+l,j) | M(i,j) | |
| 0 | 0 | 0 | X | X | X | X | 0 | CLEAR |
| 0 | 1 | 0 | X | B(i,j) | X | X | $\overline{B(i,j)}$ | COMPLEMENT |
| 1 | 0 | 0 | X | X | B(i+l,j) | X | $\overline{B(i+l,j)}$ | SHIFT COMPLEMENT |
| 1 | 1 | 0 | X | B(i,j) | B(i+l,j) | X | $\overline{B(i,j)} + \overline{B(i+l,j)}$ $[= \overline{B(i,j) \cdot B(i+l,j)}]$ | NAND |
| 0 | 0 | 1 | X | X | X | X | 1 | SET |
| 0 | 1 | 1 | X | B(i,j) | X | X | B(i,j) | IDENTITY |
| 1 | 0 | 1 | X | X | B(i+l,j) | X | B(i+l,j) | SHIFT (i+l) $\longrightarrow$ i |
| 1 | 1 | 1 | X | B(i,j) | B(i+l,j) | X | $\overline{\overline{B(i,j)} + \overline{B(i+l,j)}}$ $= B(i,j) \cdot B(i+l,j)$ | AND |

X = DON'T CARE VALUE ( LOGIC '0' OR '1' )

B = 0 OR 1

SPATIAL LIGHT MODULATORS

This application is a continuation of application Ser. No. 540,905, filed Jun. 20, 1990, now abandoned.

FIELD OF THE INVENTION

This invention relates to spatial light modulators.

BACKGROUND OF THE INVENTION

Figure 1:
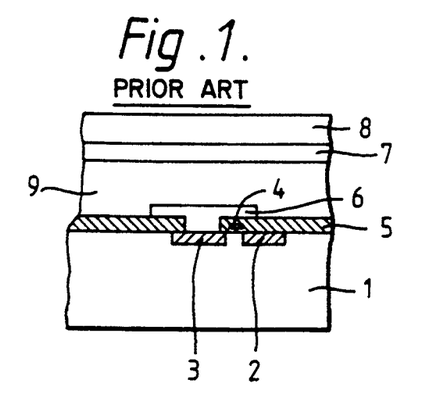
FIG. 1 illustrates a cross-section through a conventional liquid crystal display.

The design of electrically addressed spatial light modulators (SLM) has been influenced to a great extent by the displays industry, although there are major differences between the requirements for good displays and those for SLMs. Typically a conventional liquid crystal display as illustrated in FIG. 1 and which may form the basis of an SLM, comprises a silicon substrate 1, an FET comprised by source and drain regions 2, 3 and a gate 4 in a silicon dioxide layer 5 which is apertured to provide electrical contact between a transparent electrode 6 and drain 3. Another transparent electrode 7 is provided on a transparent panel 8. A liquid crystal, for example a ferro-electric effect chiral smectic liquid crystal material 9 is disposed between the electrodes 6 and 7. The cell (pixel) may be operated by applying a control signal to the gate such that the electrode 6 is driven to a positive or negative voltage relative to the other electrode 7 so as to switch the ferroelectric liquid crystal material between its two stable states, i.e. cause it to appear light or dark, for example. Attention is directed to our GB patents 2149555B, 2149176B, 2166256B and 2188742B, which describe various aspects of the structure and operation of ferroelectric liquid crystal displays.

A second important electro-optic effect in chiral smectic liquid crystals is the "electroclinic effect" which uses the "soft mode" dielectric response (Bahr C. H. and Heppke G, Liq. cryst, 2(6), 825–831, 1981; Collings N., Crossland W. A., Chittick R. C. and Bone M. F., Proc. SPIE, 963, (in print), 1989). This electroclinic effect is capable of a sub-microsecond response as is the ferro-electric effect, but the electroclinic effect also gives an analogue response to the voltage, that is the optic axis of the liquid crystal medium rotates (in plane of the liquid crystal layer) by an amount that is proportional to the applied voltage. Switching times of several hundred nanoseconds have been observed (Davey A. B. and Crossland W. A., Second International Conference on Ferro-electric Liquid Crystals, Goteberg, Sweden, June 1989) and also significant optical responses at voltages compatible with silicon integrated circuits.

In principle, electro-optic effects in chiral smectic liquid crystals may alter the amplitude and/or phase of incident light.

The electro-optic effects in ferro-electric liquid crystals (tilted chiral smectic phases, such as Sm C*) utilise the Goldstone mode dielectric relaxation which in principle allows phase modulation of light beams as well as intensity modulation (Tomas Carlson, Boštjar Žekš, Cene Filipič and Adrijan Levslik, Ferro-electric, 1988, Vol 84, pp 223–240). This arises because the n director of the liquid crystal, which coincides with the optic axis, is not constrained to move only in a plane orthogonal to the light beam. It can adopt any position on a cone of angles. This out of plane movement is often suppressed in the realisation of electro-optic effects, for example in so-called "surface stabilised" devices (N. A. Clark and S. T. Lagerwall, Appl. Phys. Lett. 36, 899, 1980). This, however, need not necessarily be the case (W. A. Crossland, M. Bone, P. W. Ross, Proc. S.I.D., Vol. 29, No. 3, pp 237–244, 1988).

The electroclinic effect in chiral smectic A liquid crystals utilises the soft mode dielectric relaxation, which in the device geometry normally used (Bahr. C. H. and Heppke—see above) does not allow analogue modulation of the phase of a normally incident light beam, because the principal optic axis is rotated by electric fields only in a plane orthogonal to the light beam.

For both "stabilised" Goldstone mode devices (ferroelectric) or electroclinic (soft mode) devices, the phase of an incident light beam can be modulated by the electro-optic effect when the angle of incidence of the light is not parallel to the plane of the smectic layers, or orthogonal to the plane containing the movement of the optic axis.

SUMMARY OF THE INVENTION

According to one aspect of the present invention there is provided a smart pixel comprising a chiral smectic liquid crystal light modulator disposed on a semiconductor substrate and having associated therewith electronic circuitry formed in the semiconductor substrate in the vicinity of the modulator, which circuitry is additional to that required to switch the modulator and is such as to provide localised pointwise operation at the modulator.

According to another aspect of the present invention there is provided a smart pixel comprising a chiral smectic liquid crystal light modulator disposed on a semiconductor substrate and having associated therewith electronic circuitry formed in the semiconductor substrate in the vicinity of the modulator, which circuitry is additional to that required to switch the modulator and is such as to provide electrical signal processing and conditioning.

According to a further aspect of the present invention there is provided a smart pixel comprising a chiral smectic liquid crystal light modulator disposed on a single crystal silicon substrate and having associated therewith electronic circuitry formed by VLSI technology in the silicon substrate in the vicinity of the modulator, which circuitry is additional to that required to switch the modulator and serves to provide localised intelligence at the modulator.

BRIEF DESCRIPTION OF THE DRAWINGS

Embodiments of the invention will now be described with reference to the accompanying drawings, in which.

DESCRIPTION OF THE PREFERRED EMBODIMENTS

In a conventional spatial light modulator the pixels respond to a digital or analogue voltage. The present invention is concerned with special spatial light modulators i.e. so-called smart pixels. The notion of smart pixels arises when "localised intelligence" is included at the pixel (light modulator). Such localised intelligence includes, for example, static memory, digital to analogue conversion and photodetector/threshold circuitry, examples of which and other possibilities will be described hereinafter. This local intelligence is provided by extra circuitry to that provided for the basic switching function of the modulator, which is described above as an FET. The extra circuitry can be formed at the same area of the substrate as the modulator or at least in its vicinity.

The marriage of chiral liquid crystal and single crystal silicon VLSI substrate technologies is believed currently to offer the best prospects for smart pixel devices. With silicon VLSI technology, submicron feature sizes are predicted. This means that a useful amount of circuitry can be collected under a single pixel light modulator of say 100 microns square. The chiral liquid crystal technology, which includes ferro-electric and electroclinic effects, offers large electro-optic modulation effects at comparatively low voltages. Therefore, much finer line technologies than are possible with, for example, PLZT modulators can be exploited. In addition, the total power dissipation, which is not inconsiderable in more sophisticated versions of these devices benefits from the low capacitance and low operating voltage of the chiral crystal material. All electro-optic modulation possibilities can be catered for; binary amplitude (ferro-electric); binary phase (ferro-electric); analogue amplitude (electroclinic); and analogue phase (electroclinic or ferro-electric).

Thus it can be said that the smart pixel notion arises when the individual light modulator elements (pixels) are additionally associated with electronic circuitry and/or optical detectors that allow electronic conditioning or processing of signals or data within the pixels, or the electronic communication of data between pixels. From this direction it can be considered that more functionality is being added to the pixel. From a second direction the notion of an electronic island, which is equivalent to a smart pixel, is arrived at.

In an optimised electro-optic system the size of the smart pixels might correspond to the distance over which it is more efficient to communicate using electronics rather than optics. For silicon logic operating at the fastest possible clock frequencies this size might be in the range of 100's of microns to millimeters. However, this is not to say that systems may rely on smart pixel structures where the pixel size is less than this value.

Figure 2:
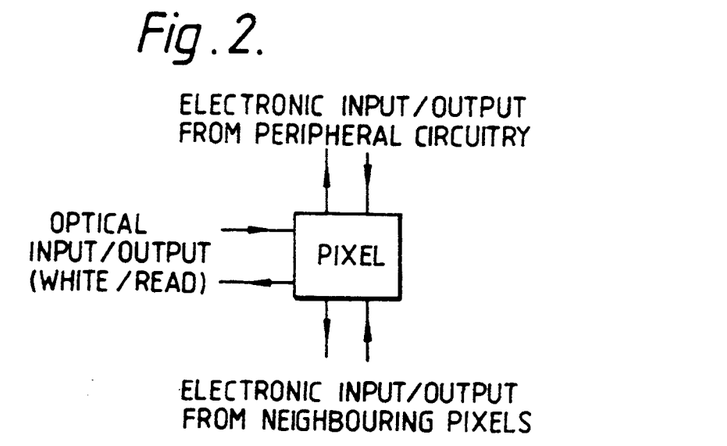
FIG. 2 illustrates input/output to a smart pixel.

The most general smart pixel (FIG. 2) in an array of such pixels can receive data from three sources: electronic input from the peripheral circuitry; electronic input from the neighbouring pixel circuitry; and optical input from distant arrays. The pixel transmits data to the peripheral circuitry (when it is acting as a pure photodetector), to neighbouring pixels (when some local neighbourhood operation or scrolling is required), or back into the optical realm via the liquid crystal modulator.

A conventional arrangement used for driving nematic liquid crystal pixels in display devices is shown in FIG. 1. A similar arrangement may be used to drive ferro-electric liquid crystal pixels in spatial light modulators. The objectives of adapting this arrangement in ferro-electric liquid crystal SLMs is to reduce the time required to address one frame of data compared with a directly multiplexed array of pixels, and to improve the contrast ratio, perhaps from 100:1 to a much larger value.

In FIG. 1 a switching transistor is provided at each pixel to switch it on or off. There is an active backplane containing one switching transistor, as illustrated, at each pixel so that the pixel circuitry resembles a Dynamic Random Access Memory (DRAM) cell with the ferro-electric liquid crystal as the capacitor dielectric. Such an arrangement is not however "smart".

With a DRAM pixel structure as described above and active backplane addressing there are row and column conductors. The rows are connected to the gates of the transistors, the columns to the sources and the pixel pads (electrodes) to the drains. The power dissipation in chiral smectic liquid crystal modulator arrays is low. Due to the high resistivity of the liquid crystal (resistivity of order $10^{10}$ $\Omega$ cm) the pixel behaves as a capacitor with negligible leakage. Consequently, the power is dissipated in the transistor drivers and the conducting tracks to the pixels.

For DRAM type cells using chiral smectic liquid crystals on silicon technology there are limitations when we try to increase the spontaneous polarisation of the liquid crystal, in an attempt to decrease switching time and increase frame rate. Such problems may be greatly reduced at the expense of increased pixel complexity by using pixel circuitry resembling static RAM memory cells such that the electro-optic switching does not occur in an isolated capacitor, rather the pixel capacitor voltage is maintained by supplying dc voltages to each pixel. SLM with pixel circuitry resembling static RAM memory cells and employing the substantially slower nematic liquid crystals have previously been proposed. The present invention, however proposes smart pixels based on silicon integrated circuit technology (VLSI) together with chiral smectic liquid crystals. The use of chiral smectic liquid crystal upon silicon VLSI technology is advantageous since the speed of one technology complements that of the other whilst minimising power dissipation. Static RAM memory cells using chiral smectic liquid crystals are only one example of smart pixels i.e. pixels with "localised intelligence" provided thereat, or, in other words, pixels incorporating signal processing and conditioning.

There are various applications in optical signal/information processing where smart SLMs (pixels) may be employed. The pixel may be optically or electrically addressed with the light modulation being binary or analogue in amplitude or phase.

In digital optical processing, the arithmetic and logic operations relating two image arrays may be implemented using seven basic operations involving nearest neighbour pixels (left, right, up, down; or N, S, E, W, (north, south, east, west)). These are the shift operators (left, right, up, down), the array complement operator, a substitutional operator (which detects a target pattern and replaces it by an "icon" pattern everywhere in the image) and an array OR operator operating pixel by pixel on the two images. The basic logic operations may be realised very conveniently using smart binary pixels as the processing arrays. The adaptive interconnects between the logic arrays may be specified by an N x N optical cross-bar switch. A smart binary pixel may also be used to provide temporary storage of data images. Digital optical processing will be discussed in greater detail hereinafter with reference to FIGS. 9 to 13.

In optical processors, for example, coherent processors although this is not restricted to coherent processors, SLMs of high quality may be used in the input plane or as adaptive spatial filters in the Fourier transform plane to perform image enhancement and pattern recognition tasks in real time. The most general and fundamental procedure required in a coherent system is the precise analogue modulation of the amplitude and phase of the wavefront of a light beam having a well-defined wave vector. In advanced systems having several optical paths the superposition of many precisely modulated beams may be required. The phasor nature of the coherent superposition places severe restraints on the acceptable variations in phase if spurious intensity modulations are to be avoided. High optical flatness ($\sim \lambda 100$ nm in reflecting devices) and homogeneity are needed to limit spurious phase variations to $\leq 0.1$ rads for optimum performance. Smart pixels with DAC circuitry in each pixel, to be described hereinafter, enable these severe mechanical tolerances to be relaxed by providing the facility to tune the optical response over the area of the device.

Figure 3:
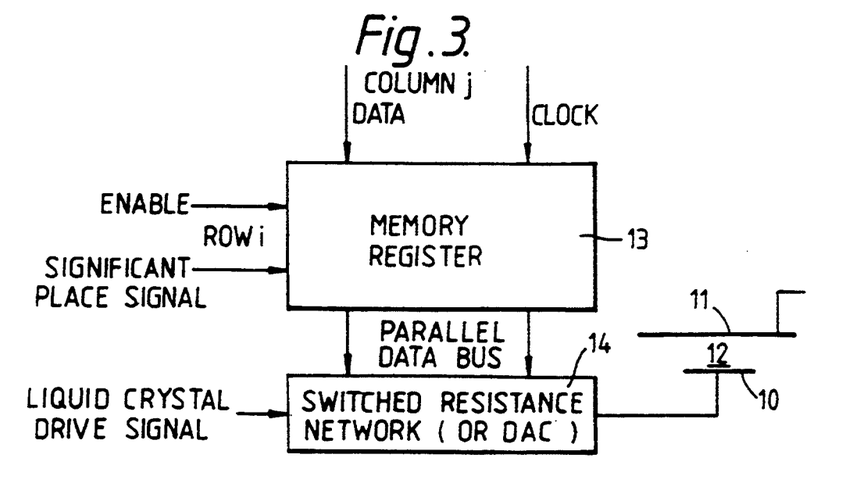
FIG. 3 illustrate schematically one embodiment of the smart pixel.

A basic smart analogue SLM which has a grey scale facility may have smart pixels which incorporate the functions shown in FIG. 3. The pixel is the (i,j)th of an array. A pixel electrode/mirror 10 is provided on a semiconductor substrate. There is a counter electrode 11 overlying a chiral smectic liquid crystal layer 12. There is a memory register 13 and a switched resistance network (or DAC - digital to analogue converter) 14. A liquid crystal drive signal is applied to network 14. The drive signal may be derived from any of the following:

(a) a common power rail in order to give the same constant voltage to all pixels;
(b) an external D.C. or A.C. (i.e. clocked) voltage source;
(c) a voltage signal generated by the intensity of the light incident on a photosensor within the pixel circuitry;
(d) a voltage signal generated by interrogating neighbouring pixels.

The drive signal is tuned to the pixel electronically using network or DAC 14. A 3-bit controlled network can provide 8 levels of amplitude control on the signal applied across the liquid crystal layer in each pixel. Operation may be as follows. Following reset, a "significant place" signal is broadcast to inform the silicon array that a data record about to be transmitted constitutes the bit pattern for the most significant grey level of an image. For each pixel the signal on the row "data" line is gated by the column "enable" pulse into the most significant bit of the memory register and this in turn sets the "resistance ladder" (or DAC) to modify the liquid crystal drive signal fed to the mirror/electrode of the pixel. Next, the "significant place" signal is activated again to route the next data bit into the next significant bit of the memory register. This, of course, causes further modification of the liquid crystal drive signal. The process continues until the least significant bit is loaded or until writing of the image is aborted by a microcomputer controlling the operation when, for example, an appropriate feature of significance in the image is detected. With appropriate design of the resistance network/DAC, the silicon backplane may be used in certain circumstances to (a) tune out mechanical defects in the SLM, (b) display grey level patterns at increasing levels of detail and (c) if the liquid crystal drive signal is derived from the intensity of light falling on the pixel, to perform arithmetic operations on the light reflected from the pixel mirror. Aspect (c), is also applicable to binary addressed SLMs and will be discussed in greater detail hereinafter, particularly with reference to neural networks.

Figure 4:
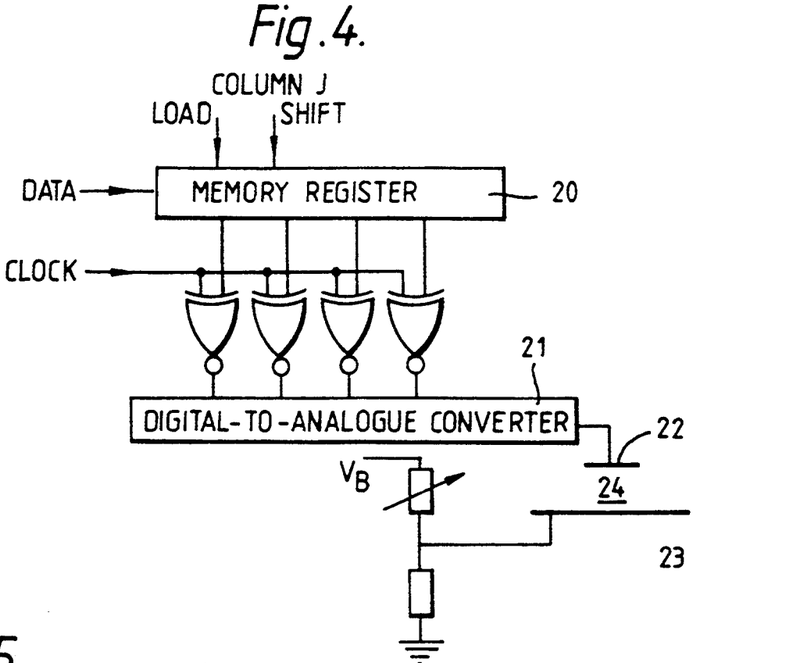
FIG. 4 illustrates schematically another embodiment of smart pixel.

FIG. 4 illustrates an embodiment of smart pixel circuitry which produces phase modulation at 8 values (at $2n\pi$, $(2n-1)\pi$ and 6 intermediate values, n being determined by the optical thickness of the cell). Data is loaded into the static memory register 20 and a data word $D_3 D_2 D_1 D_0$ used to control the resistance network in the DAC 21. The analogue output of DAC 21 is set so that the input $D_3 D_2 D_1 D_0$ generates a signal $(V_B/2 + V_D)$ and the complemented input $\overline{D_3 D_2 D_1 D_0}$ generates $(V_B/2 - V_D)$. With the XNOR arrangement shown, the voltage on the pixel mirror 22 oscillates at the clock frequency with an amplitude $V_D$ about a mean dc level of $\frac{1}{2} V_B$. The voltage bias on the counter electrode 23 ensures that there is no mean d.c. voltage across the liquid crystal 24 to cause degradation.

In digital image processing it is often essential following the capture of a scene to detect edges and contours and then to segment the image as the preliminary stage of processing. For those tasks requiring real time analysis of large data arrays, optical pre-processing may be necessary and therefore there is need for smart pixels capable of performing basic processing at high speed. This may be realised on a silicon chip by fabricating an input array of photodetectors interspaced with an optical array of light modulating pixels, formed by a liquid crystal layer over a small aluminium mirror evaporated directly on the silicon surface. The optical transmission of each pixel is controlled by the voltage drive signal fed to the mirror electrode, which drive signal is determined by the states of the neighbouring photodiodes. By incorporating appropriately designed digital circuitry in each pixel the reflected read light from the device can provide an output image with enhanced edges, improved contrast or a segmented image, as required, from a noisy input image. These pixels operate in reflection mode, but pixels operating in transmission mode are possible at wavelengths greater than one micron, in which case there are no aluminium mirrors.

Figures 5, 6:
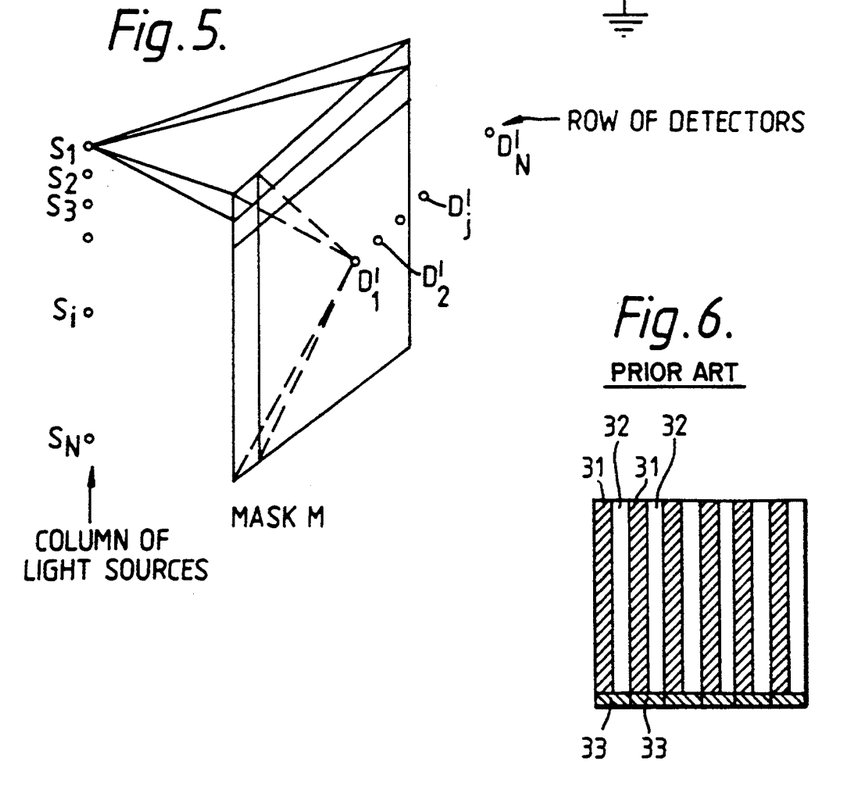
FIG. 5 illustrates optical implementation of matrix-vector multiplication.
FIG. 6 illustrates a conventional spatial light modulator.

Neural networks are parallel distributed systems for processing information in a nonalgorithmic way and are basically pattern recognition systems. Typical applications are for error correcting sub-systems in optical communications links, for associated memories in computing systems and for maintaining and controlling production lines where precise analytical procedures are not feasible and the control system has to be trained using expert knowledge. Optics is regarded as a promising technology for neural networks because of the ability to provide, economically, massively parallel interconnections. Common features uniting many neural network architectures are the multiplication of an input vector by a matrix of weights, followed by the application of a non-linear threshold to the components of the product vector. For those neural networks which can be represented mathematically by a matrix-vector multiplication, a conventional arrangement for the optical implementation of such a neural network is shown in FIG. 5 of the accompanying drawings. An input vector $S=[S_1\ S_2\ \ldots\ S_N]^T$ is realised as a column of stabilised light sources each of which illuminates uniformally a single row of elements in a mask (matrix) $M=[M_{ij}]$. Optical routing devices (lenses or holograms) ensure that the light passing through the jth column of the mask is collected by the photodetector $D'_j$. The output vector is the row $D'=[D'_1\ D'_2\ \ldots\ D'_N]$. The intensity $I_j$ of the light falling on the jth photodetector is $$I_j = \sum_i I_o S_i M_{ij}.$$

For example, in the Hopfield model [J. J. Hopfield, Proc. Natl. Acad. Sci. USA 79, 2554–58 (1982)], $S_i$ takes binary values, $M_{ij}$ may take analogue values in the range 0 to 1 and the threshold is "hard". $I_o$ is the intensity when only one source and one mask element are fully on. In the simplest version, a feedback arrangement is required which switches the source $S_j$ according to the conditions.

$S_j=1$ (ON) when $I_j > \theta_j$ $S_j=0$ (OFF) when $I_j \leq \theta_j$ where $\theta_j$ is a controllable threshold value. This is a "hard" threshold example.

When an arbitrary input vector is presented by forcing a pattern on the light sources for a short period, the system responds by finding and displaying the nearest matching pattern stored in the mask. If an adaptive mask with a temporary memory (i.e. an SLM) is used, the net may be trained to store target patterns for later recall by similar, but not necessarily identical input patterns.

Figure 7:
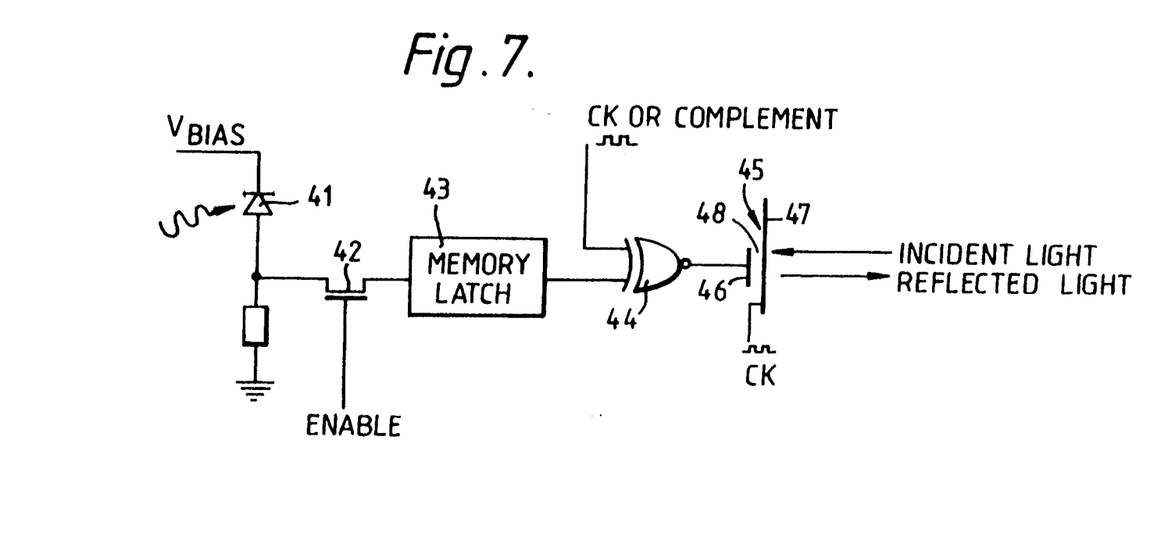
FIG. 7 illustrates schematically a photodetector/-threshold circuitry smart pixel embodiment.
Figure 8:
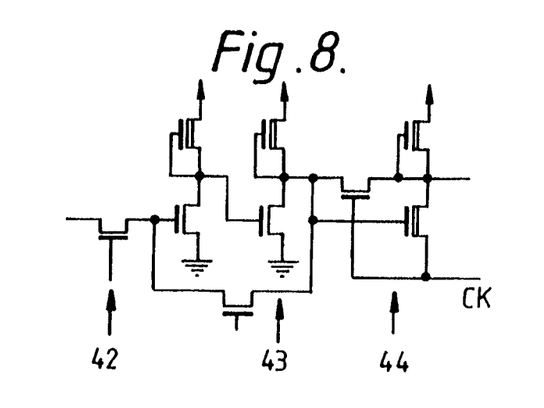
FIG. 8 indicates a possible circuit for part of the pixel of FIG. 7.

An optical neural network is described in "Designs and devices for optical bidirectional associative memories" C. Guest et al. Applied Optics. Vol. 26, No. 23, 1 Dec. 1987 p. 5055–5060. A compact bidirectional associative memory implementation described therein employs a spatial light modulator device which comprises an array of single element detectors paired with optical modulators of a similar form. Light falling on a detector causes its associated modulator to become more transparent. The known spatial light modulator shown in FIG. 6 of the accompanying drawings consists of alternating stripes of silicon photodetectors 31, and electro-optic modulators 32. The signal for each detector is amplified and thresholded by silicon drive circuitry 33 that then drives the associated modulator. Two such device arrays orientated orthogonally with a connection matrix therebetween are used to implement an optical bidirectional associative memory. It is suggested in the aforementioned article that such spatial light modulator devices may be comprised by a hybrid system with silicon detectors and circuitry and PLZT modulators. According to the present invention it may be comprised by a smart pixel incorporating a photodetector, a liquid crystal modulator cell and appropriate drive circuitry and formed by a chiral smectic liquid crystal on silicon technology. FIG. 7 shows a circuit on which such a smart pixel is based. It comprises a photodetector 41, a pass transistor 42, a memory latch 43, an XNOR arrangement 44 and a liquid crystal modulator cell 45 including a pixel mirror 46 and a counter electrode 47 between which the liquid crystal 48 is disposed. FIG. 8 illustrates a possible arrangement of transistors which comprise the pixel circuit i.e. the pass transistor 42, the memory latch 43 and the XNOR 44.

This circuitry shows how the circuit functions might be carried out using an electro-optic medium (e.g. a liquid crystal) that responds to the RMS applied voltage. In the cases considered here of the effects in chiral smectic liquid crystals, this circuitry would be modified to reflect the polarity sensitive response of these electro-optic materials.

The threshold $\theta_j$ at which the pixel latch may be triggered when the pass transistor is ENABLED is determined by the voltage bias, $V_{bias}$. The latch is therefore set or reset depending on the total intensity of the light incident in the photodetector (photodiode) 41. The output of the memory latch controls through the XNOR arrangement the voltage drive signal applied to the mirror electrode. The provision of the latch means that an applied voltage can be removed without the voltage on the pixel (liquid crystal) decaying. A universal clock signal CK or its complement is applied to the XNOR arrangement and the clock signal CK is applied to the counter electrode. The complement input enables image reversal to be performed and is used to ensure that there is no net d.c. bias applied across the liquid crystal. Depending on the condition of the ENABLE input, the cell may be run asynchronously or with clocked synchronous logic. The circuitry elements of FIG. 7 may all be formed in silicon technology and the liquid crystal may extend over the detector as well as the modulator provided that the liquid crystal is always transmitting over the detector and there is some method of isolating the modulator drive circuit from photoactuation by light falling on the detector. Attention is directed to our co-pending GB Application 8911917.6 (N. Collings - 8) the contents of which are incorporated herein by reference which describes use of photodetector/threshold circuitry smart pixel as a neural plane for neural network applications.

Various examples of smart pixel constituent parts and functions are summarised in the following, namely:

1. Photodiode; latch; hard limit threshold and ferroelectric liquid crystal modulator. An array of such smart pixels can provide an implementation of a Hopfield neural network.
2. Photodiode; latch; AND/OR logic in association with neighbouring N, S, E, W pixels and ferroelectric modulator. An array of such smart pixels can implement the basic operations of binary image algebra.
3. Photodiode; latch; N, S, E, W connections and ferro-electric modulator. Such smart pixels can be employed, for example, in an optical correlator where there is the possibility of spatial variance limiting the system or where a coordinate transformation is being performed and it is important to centre the image correctly, in which case lateral motion of a captured image could be important.

4. as 3 and with detection circuitry at the periphery of the array. A smart pixel photodetector array for recognising sequences of correlation peaks can thus be achieved.
5. One photodiode associated with a line of modulators and with hard wired logic so that the photodiode can switch one modulator on while the rest remain off. This arrangement is an important component for SLM cross bar switches.
6. Latch; resistance ladder; ferro-electric/electroclinic modulator. This can implement the DAC function.
7. 64 element photodiode array; microprocessor; 64 ferro-electric modulators. This can implement a 64-channel optical bus interconnected between processors.

The above description refers only to examples of possible smart pixels. The exact integrated circuitry associated with the pixel will clearly vary in dependence on the intended function of the smart pixel. In order to use silicon area economically the integrated circuitry should be positioned under the light modulator (mirror) and provide an active backplane therefore. This requires that a planarisation technique be employed to produce optically flat surfaces over the integrated circuitry.

The localised intelligence at the modulator referred to above may comprise localised pointwise operations at the modulator, for example a Sobel operator which is a weighted sum of nearest neighbour pixel values in the case of pixels disposed in arrays. Electrical signal processing and conditioning at a pixel may, for example, comprise thresholding. By providing one or more photodetectors at each pixel the intelligence could be modified optically in addition to electronically.

Digital optical processing using smart pixels will now be discussed in greater detail. It is well known in digital image processing that a machine to implement any arbitrary binary logic function relating two 2-D bit arrays of data (binary images) may be constructed using a combination of logic gates selected from a basic set.

A typical basic set of logic gates, functions or operators is:

1. An identity operator which leaves the 2-D bit array unchanged.
2. Shift left, right, up and down operators which produce movement of the image relative to the array indices by displacement of the complete image a single bit to the left, right, up or down.
3. An array complement operator which replaces the logic value in each pixel of the array by its logical complement.
4. A NAND operator which generates the logical NAND between the data value in a pixel of one image and that in the corresponding pixel of the second image.

Another desirable operator is a substitutional operator which detects a pattern in an image and replaces that pattern everywhere by another (substitutional) pattern.

Figure 9:
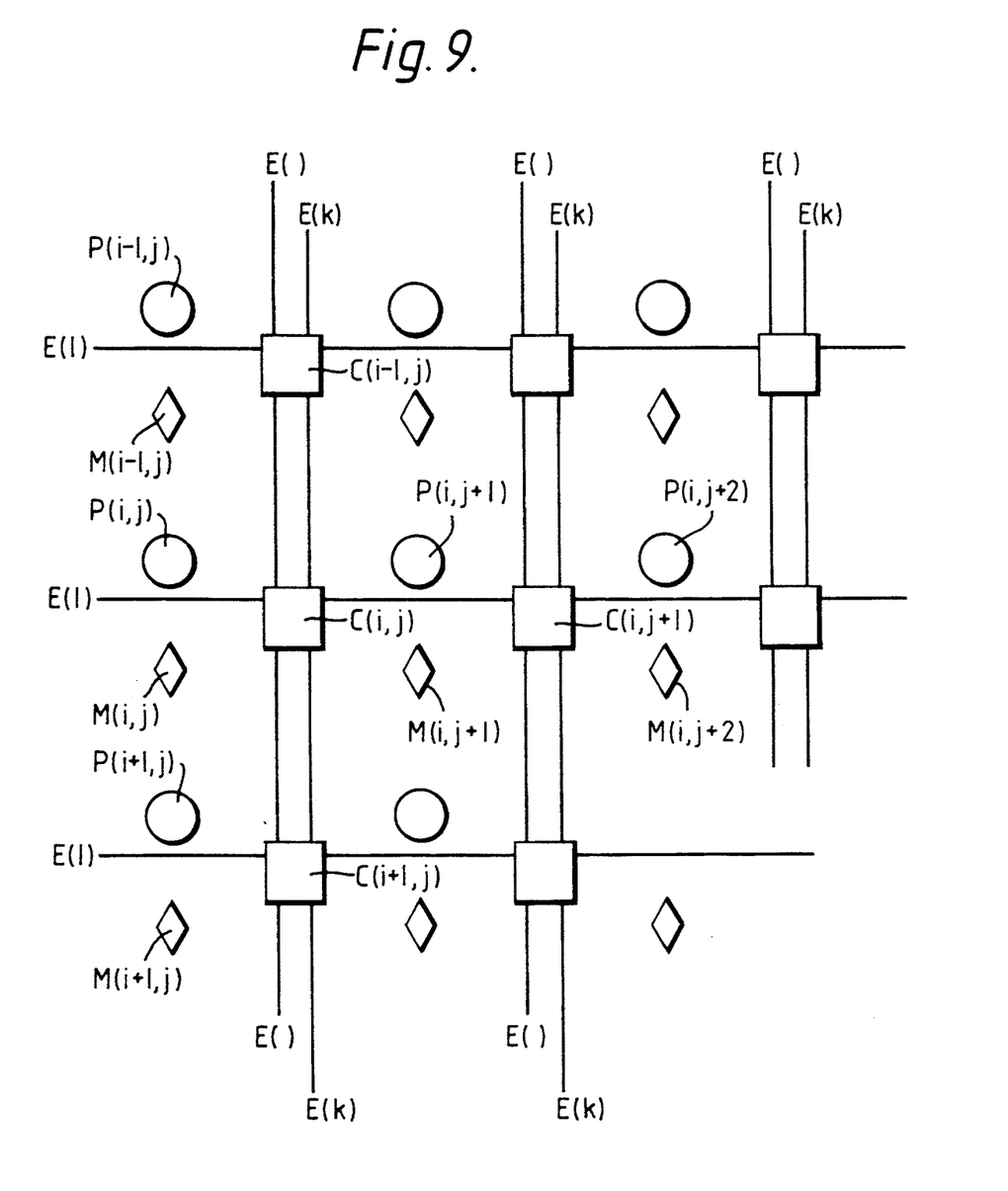
FIG. 9 illustrates an array of photosensors, modulators and microcircuits.

A hybrid electronic-optical device which can form the basic element for an optical logic processor or computer is illustrated schematically in FIG. 9. The device consists of a 2-dimensional array of smart pixels fabricated on a substrate. Each pixel has (a) a photosensor P to detect an optical input signal (b) a transducer to modulate an interrogating light beam, or a source to generate a light beam, as an optical output signal and (c) microcircuitry fabricated on the substrate to control the modulation of the optical output beam. In FIG. 9, P(i,j) represents the photosensor, M(i,j) the modulator (or source) and C(i,j) the microcircuitry for the pixel in the $i^{th}$ row and $j^{th}$ column of the array (i=1, 2, . . . e and j=1, 2, . . . m).

The operation of the microcircuitry at each pixel is controlled by electrical signals E(1), E(2) . . . E(n) broadcast to all pixels in the array. Neighbouring pixels are interconnected so that the optical output signal L (i,j) from the $(i,j)^{th}$ pixel depends on the input light signals B(i,j), B(i+1, j), B(i-1,j), B(i,j+1) . . . etc applied to the $(i,j)^{th}$ pixel and its neighbours, the precise response being determined by the values of the electrical input signal E(k), k =1, . . . n. By arranging that the response is as specified in the Boolean expressions ("An adaptive Fourier optical processor", I. Underwood, P. H. Wilson, R. M. Sillitto and D. G. Vass, Proc SPIE 860, 2-8 (1987)), or equivalent relationships, all of the basic 2-dimensional logic processing functions discussed above can be realised in a single device and selected under electrical control.

$$L\ (i,j) = R(i,j).\bar{E}(6) + \bar{R}\ (i,j).E(6) \qquad (1)$$

Where $$\bar{R}\ (i,j) = \bar{E}(1).\ B(i,j) + \bar{E}(2).\\ B(i,j-1) + \bar{E}(3)B(i,j+1) + \bar{E}(4).\ B(i-1,j) + \bar{E}(5).\\ B(i+1,j)$$

Valid output signals are obtained for all pixels having $$i=2, 3 \ldots, (e-1)$$

and $$j=2, 3, \ldots, (m-1)$$

The function in equation (1) can be realised by many different variants of this logic expression. De Morgan's theorem allows interchange of AND and OR function, for example.

In principle the individual pixels can each be programmed to perform a specific logic operation independently by including a sufficiently large number of electrical control signals or, more efficiently, by providing memory registers in the microcircuitry at each pixel to store the control code. Powerful processing arrays without pixel memory registers can also be fabricated by partitioning the array into a few sub-arrays either in contiguous blocks or interlaced so that while each pixel in a sub-array performs identically, the sub-arrays may carry out different optical logic operations if necessary.

Figure 10A:
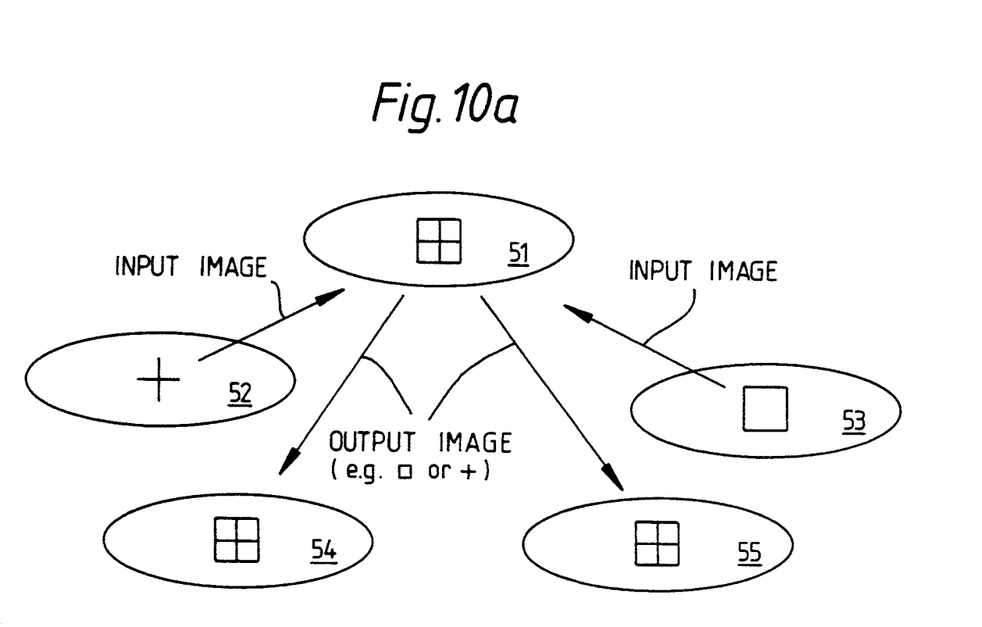
FIGS. 10a, 10b, 10c illustrate three views a, b and c (perspective, plan and elevation) of an optical interconnect scheme between array devices.
Figure 10B:
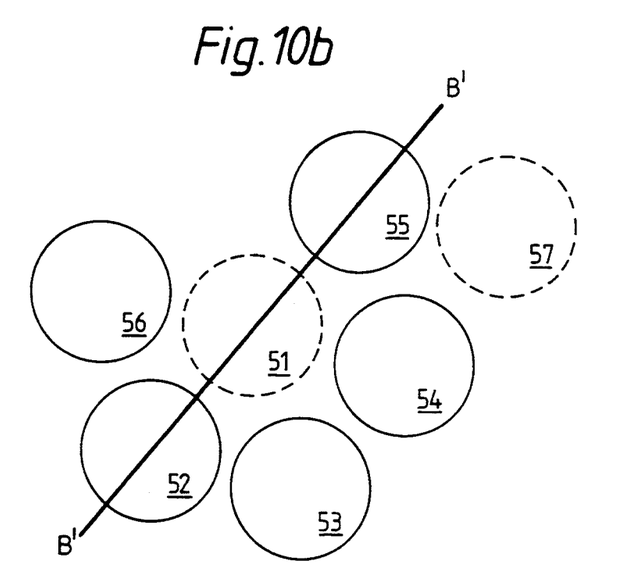
Figure 10C:
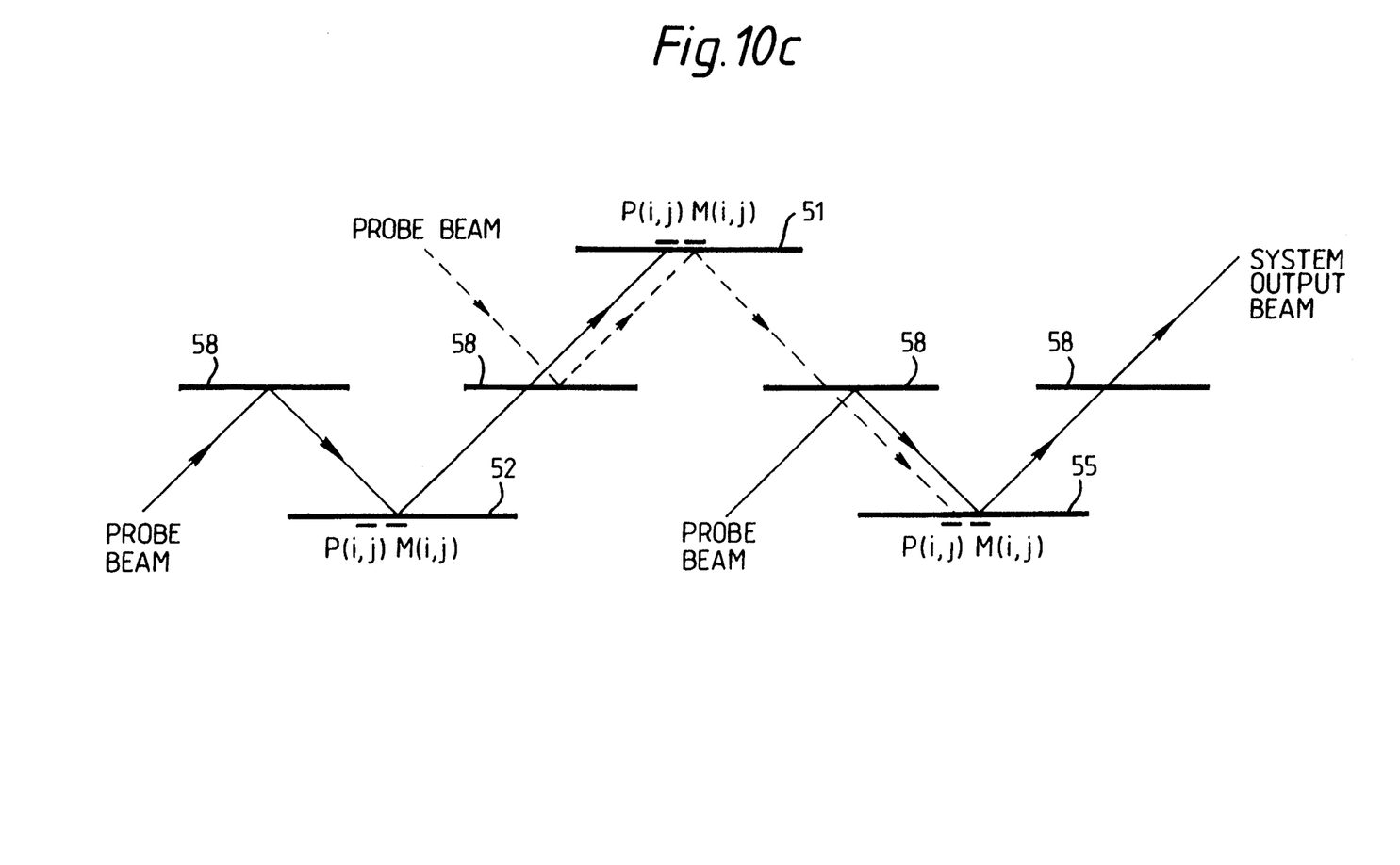

How this is used in a system will now be discussed with reference to FIG. 10 (a, b and c) in which a hybrid processing array 51 is connected into a system with arrangements to receive the output images from at least two other arrays (52 and 53) accurately registered onto its photosensors. The array 51 also transmits the output image from its modulators to the input photosensors on at least two other arrays (54 and 55) again accurately in register pixel by pixel. The imaging optics is not shown in detail in FIG. 10 but it may be implemented using standard lenses and beam splitters (58), holographic elements, lenslet arrays and/or integrated optics techniques.

By assembling systems using standard optical interconnects and the standard hybrid electronic-optical processing arrays, versatile optical logic processors or computers can be assembled from only a few types of modulator units. The logical architecture is determined thereafter by the electrical signals. The information is carried between logic gates by restored optical signals.

As discussed above with reference to FIG. 1 etc, the computing/processing devices can be constructed using advanced silicon microfabrication and liquid crystal technologies. The inclusion of photodiodes or phototransistors as the photosensors fabricated on the single crystal silicon substrate or in amorphous silicon films grown on the surface, is a straightforward process. Clearly there are several microcircuit fabrication technologies which are compatible with the provision of photosensors and photo-emitters or light modulators in integrated devices, or at least in compact devices, and these can therefore be used to fabricate the hybrid processing array.

Two example implementations will now be referred to. The first relates to implementation of the identity, shift and complement operations. Common E(k) signals are broadcast to all pixels of an array for each k value, k=1, ... 6. For a cascade of q arrays the following operations can clearly be performed.

(i) A data image may be transmitted through the cascaded system unchanged and in the same relative position to the array indices, i.e. the identity operation can be performed.

This is achieved by setting $$E(1)=0, E(2)=E(3)=E(4)=E(5)=E(6)=1$$

on all devices in the cascade.

(ii) An image may be shifted r bits to the left where $\Gamma<q$. This is achieved by setting, for example, $$E(3)=0, E(1)=E(2)=E(4)=E(5)=E(6)=1$$

on r arrays and $$E(1)=0, E(2)=E(3)=E(4)=E(5)=E(6)=1$$

on the remaining (q - r) arrays in the cascade.

The shift right, up and down operations may be obtained in an analogous way. It should be noted that feedback techniques whereby an image leaving the cascade is subsequently fed back to the input of the cascade may be employed to produce images shifted by a number of bits longer than q. Also, by electrically coupling the last row to the first row and the last column to the first column, the rotate operators may be realised.

(iii) The array complement operation may be performed by setting $$E(1)=0, E(2)=E(3)=E(4)=E(5)=1 \text{ and } E(6)=0$$

on any array.

The second example implementation is of the array NOR operation relating two data images. In order to perform the NOR operation between two images it is necessary to arrange that the data signals for the first image I(p,q) use only the odd columns of a pixel array, and the data signals for the second image I'(p',q') use only the even columns of an array. The two images may then be accommodated in an interlaced format on a single device. When superimposing, pixel by pixel, the two data images on an array to form the interlaced data set, it is necessary to ensure that the even columns of the device inputting image I(p,q) are all set to the dark state and correspondingly for image I'(p',q'), that all of the odd columns are set in the dark state. With images I(p,q) projected on the odd columns and I(p',q') on the even columns, the pixel-wise NOR operation on the images can be performed by a hybrid device with its electrical inputs to all pixels set to the following logic states:

$$E(1)=E(3)=E(6)=0 \text{ and } E(2)=E(4)=E(5)=1$$

The results of the NOR operations are returned at the outputs to the odd columns of the array.

Figure 11:
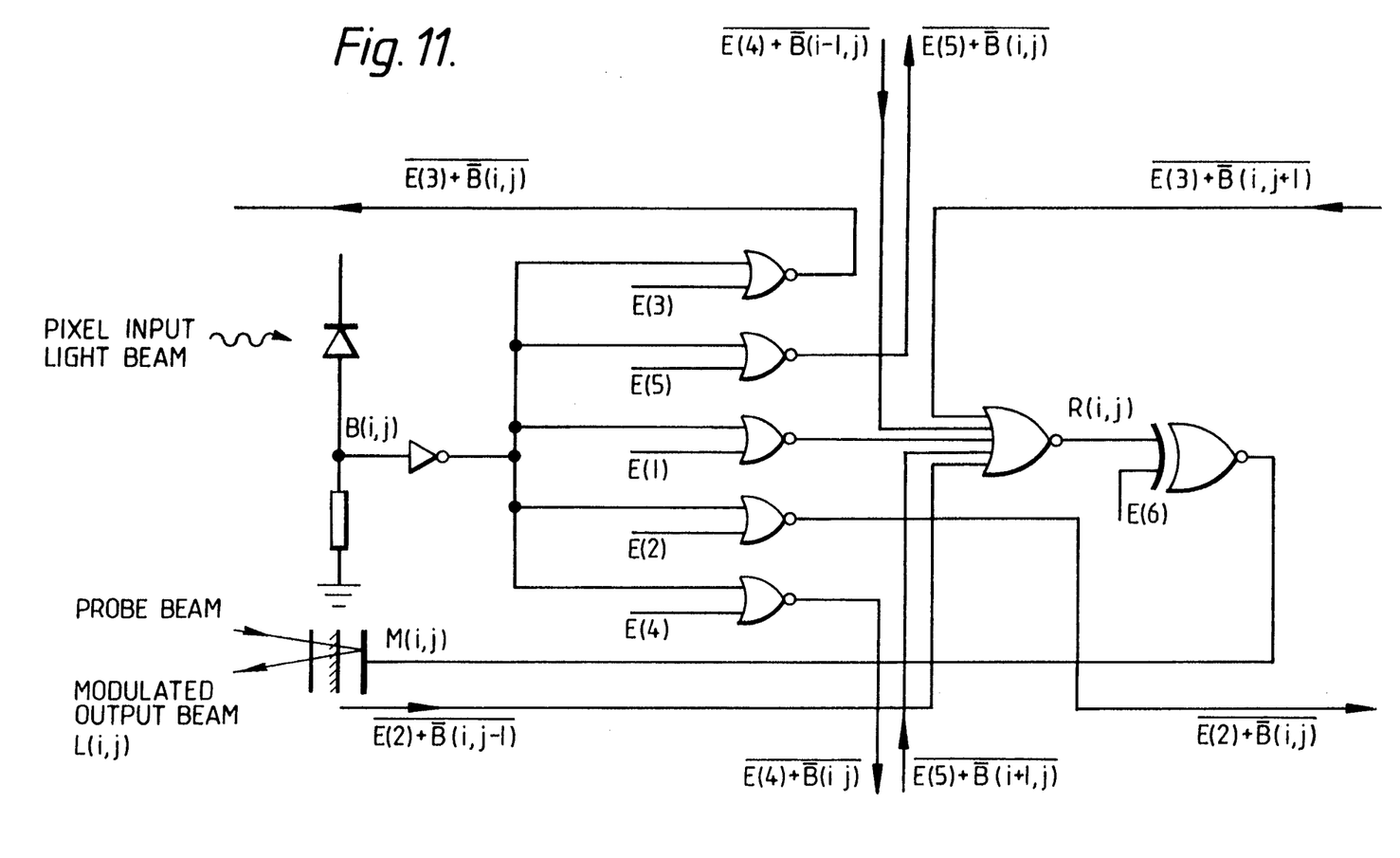
FIG. 11 illustrates an example of a circuit for a pixel of a hybrid optical processing array.
Figure 12:
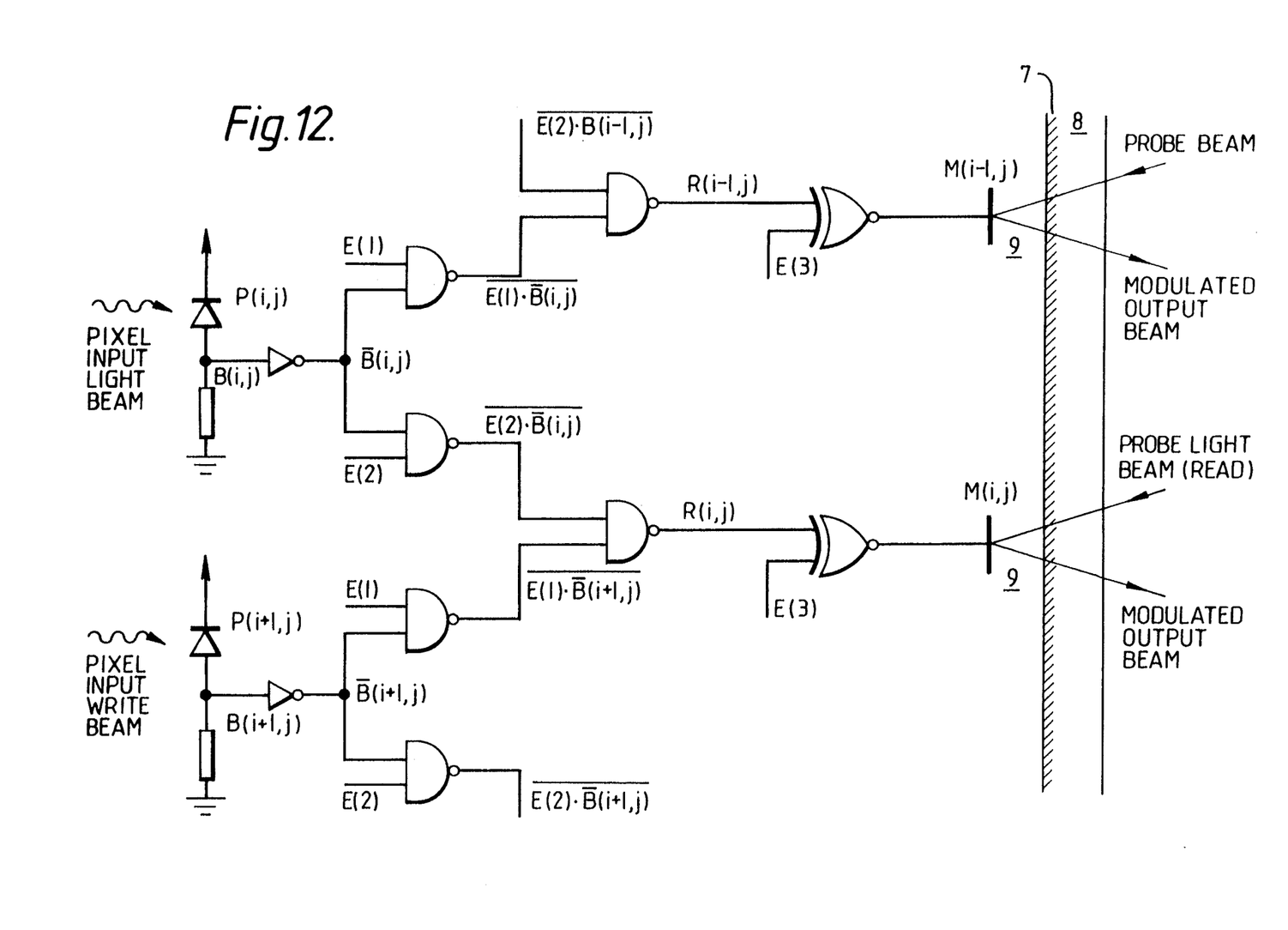
FIG. 12 illustrates an alternative circuit to that of FIG. 11.
Figure 13:
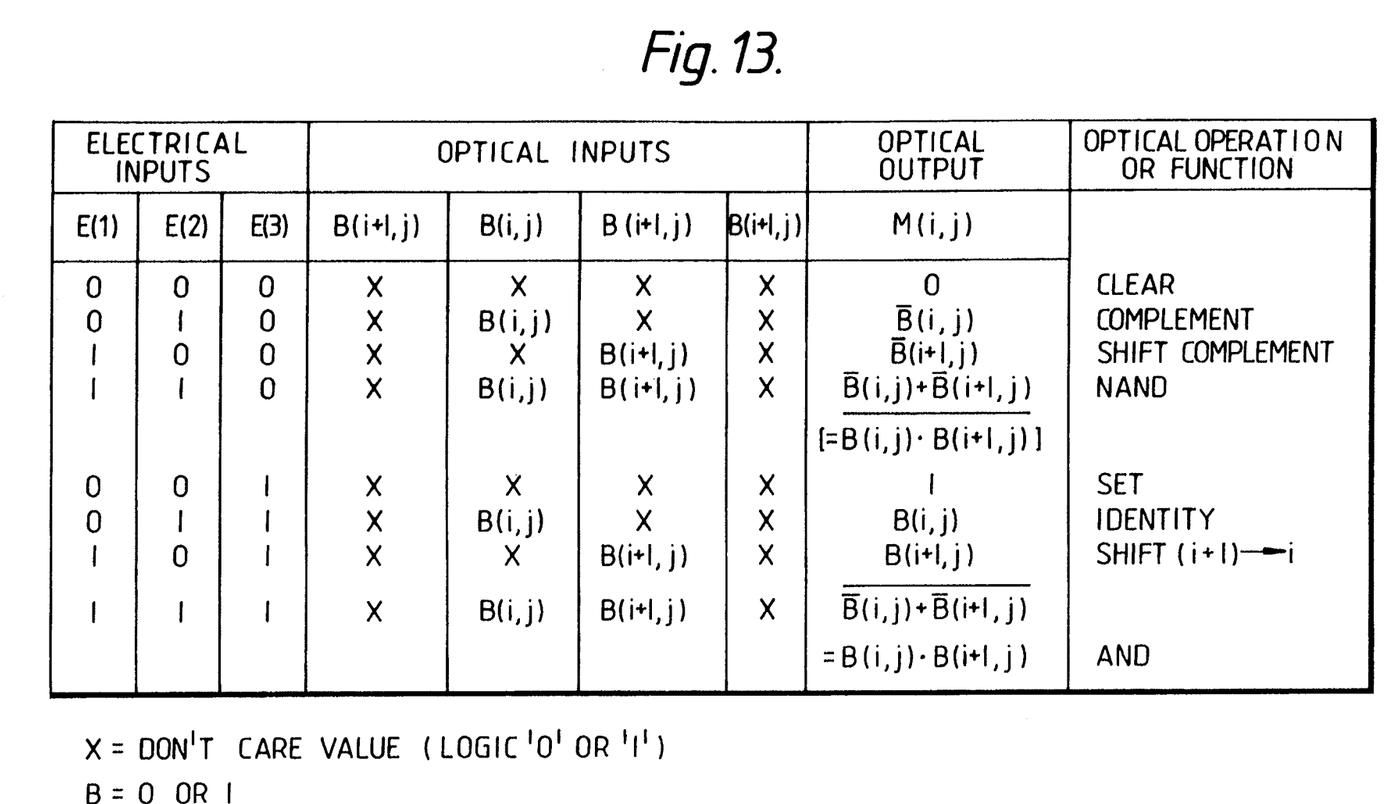
FIG. 13 illustrates a truth table showing the logic functions provided by the circuit of FIG. 12.

A typical circuit for a smart pixel of a hybrid optical processing array is shown in FIG. 11 and is considered to be self-explanatory. A less complicated but nevertheless still powerful processor may be fabricated based on the pixel circuit employed in FIG. 12 which is part of a pixel array and includes two such circuits. FIG. 12 is similarly considered to be self-explanatory. The truth table showing the logic functions available with this device is presented in FIG. 13.

The invention provides so-called smart pixels which are distinguished from conventional spatial light modulators in that they have other types of electronic and optical functionality present at the pixels in addition to, the conventional electronic component placed at the pixel so that it can be turned on an off by means of an electrical signal. By providing this additional circuitry by silicon VLSI technology and in particular by building the liquid crystal devices over the silicon VLSI circuitry, extreme circuit complexibility and flexibility can be achieved.

We claim:

1. A smart spatial modulator device whose output comprises an optical beam modulated in accordance with optical and/or electronic input signals, the device including a pixel comprising:

a chiral smectic liquid crystal material disposed between a semiconductor substrate carrying a first electrode and a panel carrying a second electrode;

first electronic circuitry formed in the semiconductor substrate in the vicinity of the first electrode for changing the sate of the liquid crystal material;

further electronic circuitry formed in the semiconductor substrate in the vicinity of the first electrode to provide pointwise operations at the pixel, said pointwise operations including logic function, amplification and thresholding;

a photodetector outputs said optical input signal for addressing said pixel;

said further electronic circuitry includes an electronic input circuitry which outputs said electronic input signal for addressing said pixel in addition to the addressing by said optical input signal or alternatively to the addressing by said optical input signal, said first and further electronic circuitry acting instantaneously to process said input optical and/or electronic signal or signals and to change the state of the liquid crystal material to modulate the output optical beam and/or to provide an electronic output in accordance with the processing carried out; the device further including a plurality of said pixels, said plurality of pixels being in combination with neighboring pixels to form an array, and each pixel of the plurality individually performs an identical logic function to the other pixels of the plurality, the array performs one of a plurality of different respective logic functions in dependence on the interconnection of said plurality of pixels.

2. A smart spatial light modulator device as claimed in claim 1 and including a plurality of pixels, said pixel comprising one of the plurality of pixels and being in combination with neighbouring pixels of the plurality of pixels.

3. A smart spatial light modulator device as claimed in claim 1 wherein the semiconductor substrate is of silicon.

4. A smart spatial light modulator device as claimed in claim 3 wherein the first and further electronic circuitry is formed by VLSI technology.

5. A smart spatial light modulator device as claimed in claim 1 and wherein said logic functions are performed on an electrical signal comprising the output of the photodetector and corresponding to the optical input signal, which logic function is performed being determined by application of corresponding electrical control signals to the further electronic circuitry.

6. A smart spatial light modulator device as claimed in claim 1 and wherein said logic functions are performed on an electrical signal comprising the output of the photodetector and corresponding to the optical input signal, which logic function is performed being determined by control codes stored in memory registers of the further electronic circuitry.

7. A smart spatial light modulator device as claimed in claim 1 and wherein information is carried between the logic functions associated with different pixels in the array by optical signals.

8. A smart spatial light modulator device as claimed in claim 1 and wherein the chiral smectic liquid crystal material is a ferroelectric effect chiral smectic liquid crystal material.

9. A smart spatial light modulator device as claimed in claim 1 and wherein the chiral smectic liquid crystal material is an electroclinic effect chiral smectic liquid crystal material.

* * * * *